Oct. 15, 1935.   A. C. MOSSER ET AL   2,017,158
TIRE INFLATING ARRANGEMENT
Filed Jan. 12, 1934   2 Sheets-Sheet 1

INVENTORS
Alvie C. Mosser
John F. Methard
BY
Gerald F Baldwin
ATTORNEY.

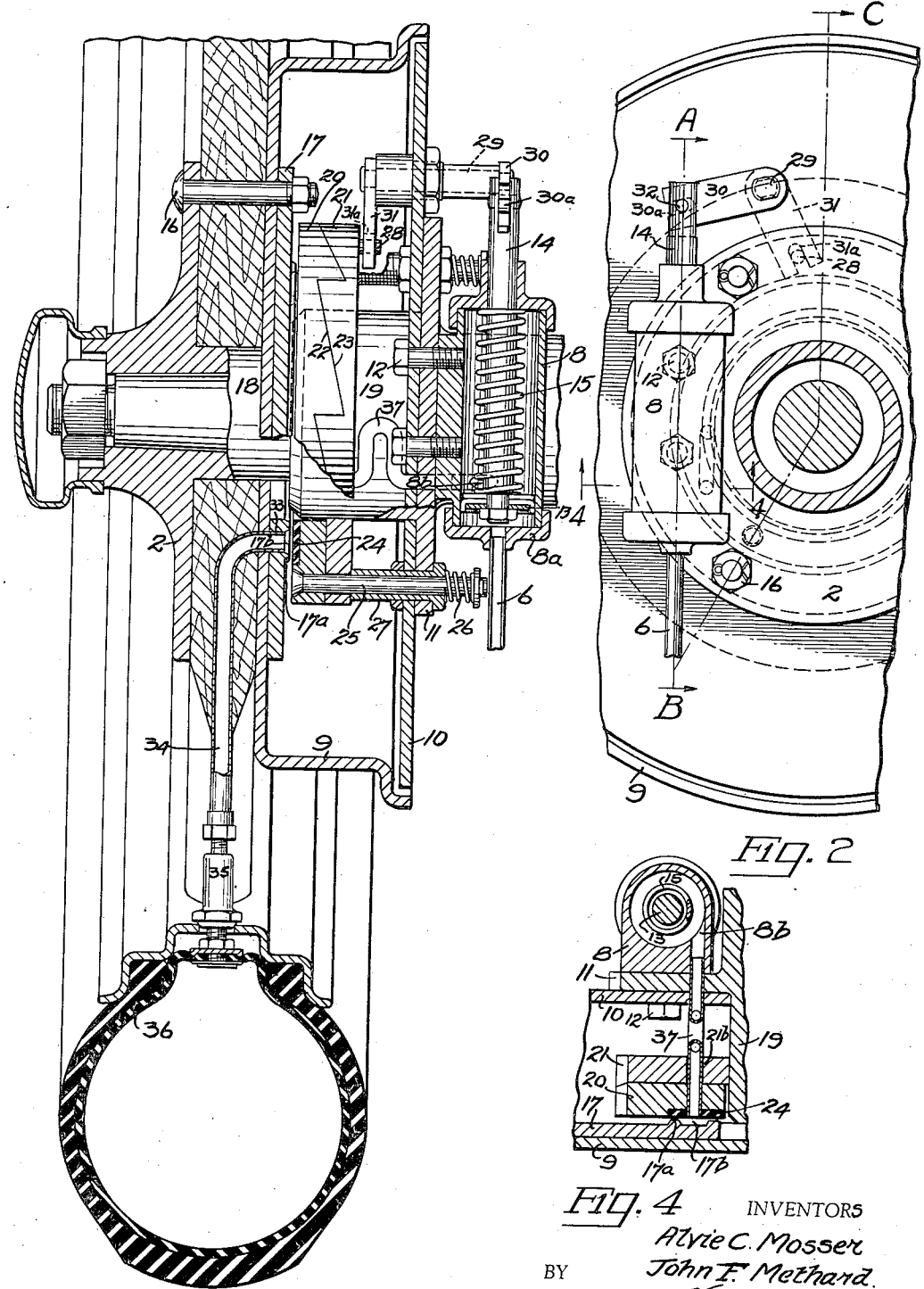

Patented Oct. 15, 1935

2,017,158

UNITED STATES PATENT OFFICE 2,017,158

TIRE INFLATING ARRANGEMENT

Alvie C. Mosser and John F. Methard, Detroit, Mich.

Application January 12, 1934, Serial No. 706,390

6 Claims. (Cl. 152—11)

This invention relates to improvements in tire inflating arrangements, and refers more particularly to means for conveying air under pressure to the tire of an automobile.

It is an object of the invention to provide an efficient and relatively simple form of tire inflating arrangement so that air may be injected into a pipe or tube having one extremity conveniently located upon a vehicle so that all the tires may be simultaneously inflated to a uniform pressure.

Another object of the invention is to provide a tire inflating arrangement whereby an airtight contact is made between the stationary and rotatable parts of the vehicle by the pressure of the air entering the pipe, so that when the device is not in use the rotatable parts mounted upon the wheels revolve free of the remaining parts of the device, thereby reducing wear to a minimum, and insuring longer life to the joint making parts.

With these and other objects and advantages in view which will become apparent as the specification proceeds, the invention is hereinafter more fully described with the aid of the accompanying drawings, in which:

Figure 2 is a partial side view of a wheel equipped with the device.

Figure 3 is a composite sectional view showing the cylinder as a section on the line A—B, and the wheel and brake drum as a section on the line B—C.

Figure 4 is a sectional view on the line 4—4 of Figure 2.

Figure 1:
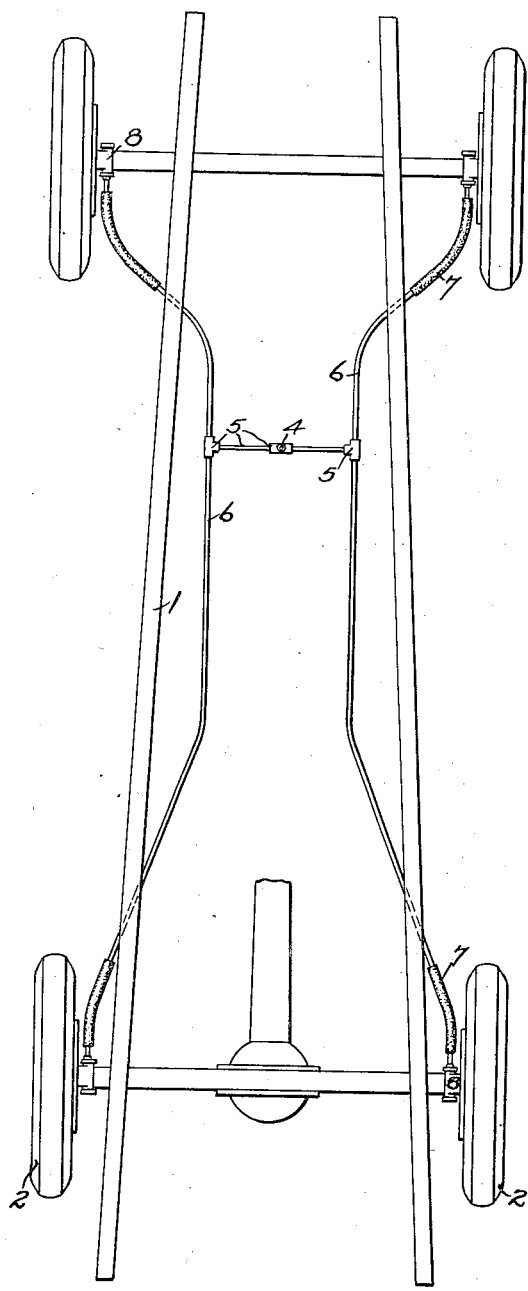
Figure 1 illustrates a reduced diagrammatic plan view of a vehicle chassis showing the arrangement of the piping through which air is supplied to all the tires.

Referring to the drawings, 1 designates a chassis on which wheels 2 are rotatably mounted. Supported by the instrument board 3 and extending therefrom is an air pipe 4 which is provided at its adjacent extremity with a conventional air inlet valve 4a. The pipe 4 is connected by suitable fittings 5 to two longitudinal air lines 6 which terminate in cylinders 8 located one adjacent each of the wheels 2. 7 denotes flexible connections provided in the air lines 6 adjacent the cylinders 8.

Figure 5:
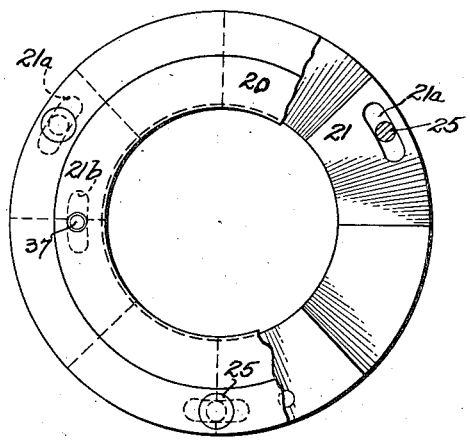
Figure 5 is a reduced size view of the two coacting rings, a portion of one of which is broken away.
Figure 6:
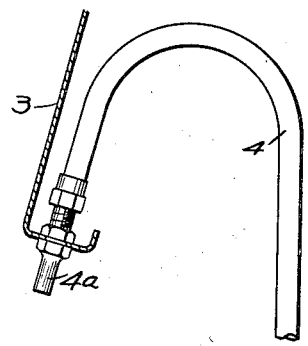
Figure 6 is a detail showing the instrument board in section, and the air inlet pipe extending therefrom.

Since the arrangement of the device at all the wheels is identical we will now describe the arrangement at one wheel only with the aid of Figures 2, 3, 4 and 5.

9 is a conventional brake drum having the usual stationary plate 10 supported adjacent its inner side. A reinforcing plate 11 rests against the inner face of the disc 10 exteriorly of the drum 9. Through both the plate 11 and disc 10 screws 12 extend which support the cylinder 8.

One extremity of one of the air lines 6 terminates in the head 8a of the cylinder 8 so that air discharged therethrough acts upon a piston 13 provided in the said cylinder. The piston rod 14 extends through the opposite extremity of the cylinder, and within the latter a spring 15 is arranged around the said rod to tend to retain the piston adjacent the cylinder head 8a.

The brake drum 9 is secured to the wheel 2 as by bolts 16 which also extend through an annular plate 17 arranged around the axle 18 and resting upon the inner face of the said drum. Freely mounted around the stationary axle housing 19 are two rings 20 and 21 which have corresponding ratchet teeth 22 and 23 formed around their adjacent faces. The outer face of the outer ring 20 is annularly grooved to receive a resilient washer 24 which is positioned opposite, and adapted to bear against, an annular raised bearing surface 17a integral with the plate 17. It will also be noted that the said bearing surface 17a is circularly grooved as indicated at 17b.

Extending through the rings 20 and 21 and through the stationary drum plate 10 and reinforcing plate 11 are bolts 25 having springs 26 so arranged thereon as to tend to draw the said rings inwardly and thus hold the outer ring 20 and its resilient washer 24 spaced from the annular plate 17. In order to limit the inward movement (away from the wheel 2) of the rings 20 and 21 sleeves 27 are provided around the bolts 25 and extend outwardly through the reinforcing plate 11 and the stationary plate 10. Moreover in order to permit limited rotation of the inner plate 21 radial slots 21a are formed therethrough for the passage of the bolts 25.

On the inner face of the ring 21 is an inwardly projecting pin 28. Rotatably supported by the drum plate 10 is a spindle 29 having arms 30 and 31 extending laterally from its extremities. The outer ends of these arms are longitudinally slotted at 30a and 31a. The slot 30a receives a pin 32 provided adjacent the outer extremity of the piston rod 14, which is preferably bifurcated, and the slot 31a receives the pin 28.

Thus it will be seen that movement of the piston 13 and piston rod 14 away from the cylinder head 8a causes rotation of the inner ring 21 through the spindle 29 and its arms 30 and 31, so that the teeth 23 of the said inner ring force the outer ring 20 towards the wheel 2 and make an airtight joint between the washer 24 and the bearing surface 17a, and thereby inclose the circular groove 17b so that it forms an annular air channel. Outwardly through the base of the groove 17b an opening 33 is provided in which one extremity of a tubular connection 34 terminates. The opposite end of the latter is provided with suitable means of attachment to a conventional air inlet valve 35 on the tire 36. As soon as air pressure is removed from the piston 13 the spring 15 causes it to return to its initial position adjacent the cylinder head 8a. Then the tension of the springs 26 moves the rings 20 and 21 back to their initial positions.

37 denotes a pipe connected at one extremity to an aperture 8b formed through the wall of the cylinder 8 intermediately of its length so that the piston 13 normally lies between it and the cylinder head 8a. The opposite extremity of the pipe 37 is secured in an aperture formed transversely through the outer ring 20 and also through the washer 24. The inner ring 21 is radially slotted at 21a for the passage of the pipe 37 so as to permit limited rotary movement of the said ring, and intermediately of its length a flexible return bend is formed in the pipe 37 to permit ready longitudinal expansion of the said pipe as the ring 20 moves axially on the axle housing 19.

No air can enter the pipe 37 until the piston 13 has been moved sufficiently to expose the pipe inlet 8b by which time the washer 24 is in contact with the bearing surface 17a and the circular air channel 17b is inclosed. Then air passes through the pipe 37 into the channel 17b and from the latter through the tubular connection 34 and tire valve 35 into the tire 36. After the piston 13 has moved back to its initial position any air remaining in the channel 17b or pipe 37 is exhausted into the atmosphere between the bearing surface 17a and the washer 24.

It will also be seen that due to the uniform flow of air to all the channels 17b of all the wheels that a like air pressure is simultaneously imparted to all the tires.

While in the foregoing the preferred embodiment of the invention has been described and shown, it is understood that the construction is susceptible to such alterations and modifications as fall within the scope of the appended claims.

What we claim is:

1. A tire inflating arrangement comprising an air feed line mounted upon a vehicle having pneumatic tired wheels equipped with air inlet valves, a cylinder in which the feed line terminates placed adjacent one of the wheels, a piston in said cylinder actuated by compressed air from the feed line, a grooved plate rotatable with the wheel, a tubular connection extending from the air valve on said adjacent wheel and terminating in said groove, a member movable against the plate to cover the groove so that the latter then becomes an inclosed channel, means operated by the movement of the piston for moving the member against the grooved plate, and a pipe extending from the cylinder through the member opposite the plate groove through which air from the cylinder is adapted to pass into the inclosed channel and from the latter into the tubular connection and air inlet valve.

2. A tire inflating arrangement comprising an air feed line mounted upon a vehicle having pneumatic tired wheels equipped with air inlet valves, a cylinder in which the feed line terminates located adjacent one of the wheels, a piston in said cylinder, a grooved plate rotatable with the wheel, a tubular connection extending from the air valve on the adjacent wheel and terminating in said groove, a ring axially movable against said plate to cover the groove so that the latter then becomes an inclosed channel, a second ring mounted coaxially with the first named ring, cooperating means on both the rings for moving said first named ring, axially when the second ring is rotated, means operated by the piston for turning the second ring, a pipe extending from the cylinder through the first named ring opposite the plate groove through which air is adapted to pass when said groove is inclosed by the said first ring, said second ring being radially slotted for the passage of said pipe, and the latter being longitudinally expansive to permit the securing of one of its extremities to the cylinder and the other to the first named ring.

3. A tire inflating arrangement comprising an air feed line on a vehicle having pneumatic tired wheels equipped with air inlet valves, a cylinder in which the feed line terminates mounted adjacent one of the wheels, a piston in the cylinder, a plate rotatable with said wheel and having a circular groove formed in its inner face, a tubular connection extending from the tire inlet valve and terminating in said groove, an axially movable ring concentric with the plate, said ring being adapted to bear against said plate and cover the groove to form an inclosed channel, means operated by movement of the piston in the cylinder for moving the ring axially against the plate, said cylinder being apertured intermediately of its length, a pipe secured in the cylinder aperture and extending through that portion of the ring which is adapted to cover the annular groove, means for returning the piston to its initial position in the cylinder when air pressure through the feed line ceases, and means tending to move the ring axially from the plate.

4. A tire inflating arrangement comprising an air feed line mounted upon a vehicle having pneumatic tired wheels equipped with air inlet valves, a cylinder in which the feed line terminates mounted adjacent one of the wheels, a piston in the cylinder, an annular plate rotatable with said wheel and having a circular groove formed in its inner face, a tubular connection extending from the air inlet valve on said wheel and terminating in said groove, a ring concentric with the annular plate which is axially movable, said ring being adapted to bear against the plate so that the circular groove becomes an inclosed annular passage, a second ring adjacent and concentric with the first named ring, teeth formed on the adjacent faces of both the rings, means operated by movement of the piston for turning the second ring so that the teeth thereon rotate against the teeth of the first named ring and move the latter axially against the plate, said cylinder being apertured intermediately of its length, a pipe mounted in the cylinder aperture and extending through that portion of the first named ring that covers the groove, means for returning the piston to its initial position in the cylinder and thereby turning the second ring back to its initial position when air pressure through the feed line ceases, and means tending to move the first named ring axially from the plate.

5. A tire inflating arrangement comprising an air feed line mounted upon a vehicle having pneumatic tired wheels equipped with air inlet valves, and brake drums secured to said wheels, a cylinder mounted adjacent one of the drums, the feed line terminating in said cylinder, a grooved plate secured within the brake drum and rotatable therewith, a non-rotatable member within the drum, a piston in the cylinder, means operated by the piston movement moving the member against the plate to close the groove when compressed air is admitted into the cylinder, a pipe extending from the cylinder through the drum and terminating in the member opposite the groove through which air passes from the cylinder into the groove when the latter is enclosed, and a tubular connection extending from one side of the groove to the air valve on the adjacent pneumatic tired wheel.

6. A tire inflating arrangement comprising an air feed line on a vehicle having pneumatic tired wheels equipped with air valves, brake drums secured to said wheels, stationery discs closing the inner faces of said drums, a cylinder mounted on one disc, the feed line terminating in said cylinder, a grooved plate secured within the drum to rotate therewith, a member within the drum, means cooperating with the disc holding the member against rotation, means actuated by compressed air admitted into the cylinder moving the member against the plate to enclose the groove, a pipe extending from the cylinder and terminating in the member opposite the groove, and a tubular connection extending from one side of the groove to the inlet valve on the adjacent pneumatic tired wheel.

ALVIE C. MOSSER.
JOHN F. METHARD.